United States Patent
Goto et al.

(10) Patent No.: US 12,293,615 B2
(45) Date of Patent: May 6, 2025

(54) DRIVING EVALUATION DEVICE AND DRIVING EVALUATION METHOD

(71) Applicant: HONDA MOTOR CO., LTD., Tokyo (JP)

(72) Inventors: Yuya Goto, Tokyo (JP); Yoshiaki Kobayashi, Tokyo (JP); Toshiaki Matsuzawa, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 442 days.

(21) Appl. No.: 17/680,334

(22) Filed: Feb. 25, 2022

(65) Prior Publication Data
US 2022/0319246 A1  Oct. 6, 2022

(30) Foreign Application Priority Data
Mar. 31, 2021  (JP) .................................. 2021-061932

(51) Int. Cl.
*G07C 5/02* (2006.01)

(52) U.S. Cl.
CPC ...................................... *G07C 5/02* (2013.01)

(58) Field of Classification Search
None
See application file for complete search history.

(56) References Cited

U.S. PATENT DOCUMENTS

| | | | | |
|---|---|---|---|---|
| 5,096,015 A | * | 3/1992 | Akishino | B60K 31/042 180/170 |
| 7,736,220 B2 | * | 6/2010 | Mori | A63F 13/577 463/6 |
| 2013/0096731 A1 | * | 4/2013 | Tamari | G06F 11/3058 701/1 |
| 2014/0018974 A1 | * | 1/2014 | Okita | G06F 7/00 701/1 |
| 2015/0298696 A1 | * | 10/2015 | Nagatsuka | B60W 30/02 701/70 |
| 2018/0218639 A1 | * | 8/2018 | Ryuzaki | G10L 15/22 |
| 2020/0031359 A1 | * | 1/2020 | Suzuki | G06V 20/597 |

FOREIGN PATENT DOCUMENTS

| | | |
|---|---|---|
| JP | 2012168958 A | 9/2012 |
| JP | 2014080087 A | 5/2014 |

* cited by examiner

*Primary Examiner* — Daniel L Greene
(74) *Attorney, Agent, or Firm* — CKC & Partners Co., LLC

(57) ABSTRACT

Provided is a driving evaluation device that enables evaluation of driving for the purpose of improving a driving time in a circuit racecourse, for example. The driving evaluation device includes an evaluation section extractor 24 that detects a deceleration section and an acceleration section in cornering, a section average classifier 25 that calculates, based on a front-rear acceleration and a lateral acceleration, an acceleration norm average value in the deceleration section and that in the acceleration section, and a skill deficiency evaluator 28 that evaluates driving skill based on the acceleration norm average value in the deceleration section and that in the acceleration section.

5 Claims, 11 Drawing Sheets

FIG. 11

| DRIVER | CLASSIFICATION | COMMENT |
|---|---|---|
| A | TURNING-AND-ACCELERATING TYPE | You have driven in the acceleration-oriented fashion and advanced your car with high efficiency. |
| B | TURNING-AND-ACCELERATING TYPE | You have performed cornering in the acceleration-oriented fasion. You can increase speed throughout each entire corner. It is advisable to review your driving so that you can increase the corner-entering speed by shifting more load before entering corners and your car will move along a line having a larger turning radius in the second half of each corner. |
| C | RUSHING TYPE | You have driven in the rushing-oriented fashion. It is advisable to review your approach to corners so that you will suitably decelerate before reaching the corners and accelerate when leaving the corners. It would be effective to selectively perform a braking operation for deceleration and a braking operation for turning. |
| D | BALANCE TYPE | You have a good balance between "Entry" and "Exit". It is advisable to suitably decelerate in the deceleration sections and suitably control the front load necessary for turning when entering corners, while keeping your acceleration-oriented driving style. In Exit section, it is advisable to focus your attention to use the tire force suitably in the acceleration side so that you can accelerate with efficiency. |

DRIVING EVALUATION DEVICE AND DRIVING EVALUATION METHOD

This application is based on and claims the benefit of priority from Japanese Patent Application No. 2021-061932, filed on 31 Mar. 2021, the content of which is incorporated herein by reference.

BACKGROUND OF THE INVENTION

Field of the Invention

The present invention relates to a driving evaluation device and a driving evaluation method for evaluating a driver's skill in driving a vehicle.

Related Art

Patent Document 1 discloses a driving evaluation device that evaluates a driver's skill in driving a vehicle in real time. The driving evaluation device discloses in Patent Document 1 evaluates, in real time, a driver's skill in driving a vehicle, based on a comparison between a composite acceleration and a threshold, the composite acceleration being obtained by combining a front-rear acceleration and a lateral acceleration of the vehicle, the threshold being set based on a speed of the vehicle.

Conventional data logger systems log data, such as a vehicle speed, a front-rear acceleration, and a lateral acceleration, while a vehicle is in motion. Analyzing the logged data makes it possible to evaluate driving in detail, and the evaluation result can be effectively utilized to shorten lap times in a circuit racecourse, etc.

Patent Document 1: Japanese Unexamined Patent Application, Publication No. 2014-80087

SUMMARY OF THE INVENTION

Meanwhile, some ordinary vehicle users also drive on a circuit racecourse and try to shorten their lap times. In such cases, it is desirable for the ordinary vehicle users to evaluate their driving in order to shorten their lap times. However, it is difficult for the ordinary vehicle users to analyze data logged by data logger systems. Furthermore, in many cases, the ordinary vehicle users cannot understand what information can be acquired by the data logger systems. Thus, the data logger systems have not yet been fully put to practical use.

It is an object of the present invention to provide a driving evaluation device and a driving evaluation method that enable evaluation of driving for the purpose of, for example, improving a driving time in a circuit racecourse.

(1) An embodiment of the present invention is directed to a driving evaluation device (e.g., a driving evaluation device 1 to be described later) for evaluating a driver's skill in driving a vehicle. The driving evaluation device includes: a section detector (e.g., an evaluation section extractor 24 to be described later) that detects a deceleration section and an acceleration section in cornering; and an evaluator (e.g., a skill deficiency evaluator 28 to be described later) that evaluates driving based on a front-rear acceleration and a lateral acceleration in the deceleration section and a front-rear acceleration and a lateral acceleration in the acceleration section.

(2) In this case, the section detector preferably judges a degree of opening of an accelerator with reference to a first judgment reference value and a second judgment reference value. The section detector preferably sets, as an evaluation section, a section from a moment at which the degree of opening of the accelerator reaches and becomes less than the first judgment reference value, to a moment at which the degree of opening of the accelerator reaches and exceeds the second judgment reference value. The section detector preferably detects the deceleration section and the acceleration section in the evaluation section.

(3) In this case, the section detector preferably sets, as the acceleration section, a section in which the front-rear acceleration is in an acceleration state subsequent to being in a deceleration state.

(4) An embodiment of the present invention is directed to a driving evaluation method to be performed by the driving evaluation device according to (1) above. The driving evaluation method includes: a section detection step including causing the section detector to detect a deceleration section and an acceleration section in cornering; and an evaluation step including causing the evaluator to evaluate driving based on a front-rear acceleration and a lateral acceleration in the deceleration section and a front-rear acceleration and a lateral acceleration in the acceleration section.

(5) An embodiment of the present invention is directed to a program that causes a computer (e.g., an arithmetic processing circuit 2 to be described later) to perform the steps of the driving evaluation method described in (4) above.

(6) An embodiment of the present invention is directed to a medium that stores the program described in (5) above.

(1) A lap time in driving on a circuit racecourse has a high correlation with a front-rear acceleration and a lateral acceleration in one lap on the circuit racecourse. For this reason, the front-rear acceleration and the lateral acceleration are applicable to valuation of a driver's skill in cornering. In view of this, the driving evaluation device according to an embodiment of the present invention evaluates driving based on the front-rear acceleration and the lateral acceleration in the deceleration section and those in the acceleration section. This feature makes it possible to evaluate driving so that the evaluation result can be utilized to shorten a driving time in a circuit racecourse, for example.

(2) The driving evaluation device according to an embodiment of the present invention sets, as the evaluation section, a section from a moment at which the degree of opening of the accelerator reaches and becomes less than the first judgment reference value, to a moment at which the degree of opening of the accelerator reaches and exceeds the second judgment, and detects the deceleration section and the acceleration section in the evaluation section. Due to this feature, the present invention enables judgment about driving skill related to cornering while eliminating the need to detect corners by way of GPS or the like, and makes it possible to evaluate driving so that the evaluation result can be utilized to shorten a driving time in a circuit racecourse, for example.

(3) The driving evaluation device according to an embodiment of the present invention sets, as the acceleration section, a section in which the front-rear acceleration is in the acceleration state subsequent to being in the deceleration state. Due to this feature, the present invention makes it possible to set the deceleration section and acceleration section based on the front-rear acceleration while eliminating the need to separately installing a sensor or the like, and makes it possible to evaluate driving so that the evaluation result can be utilized to shorten a driving time in a circuit racecourse, for example.

BRIEF DESCRIPTION OF THE DRAWINGS

FIG. 11 illustrates, as an example, displayed evaluation results.

DETAILED DESCRIPTION OF THE INVENTION

Figure 1:
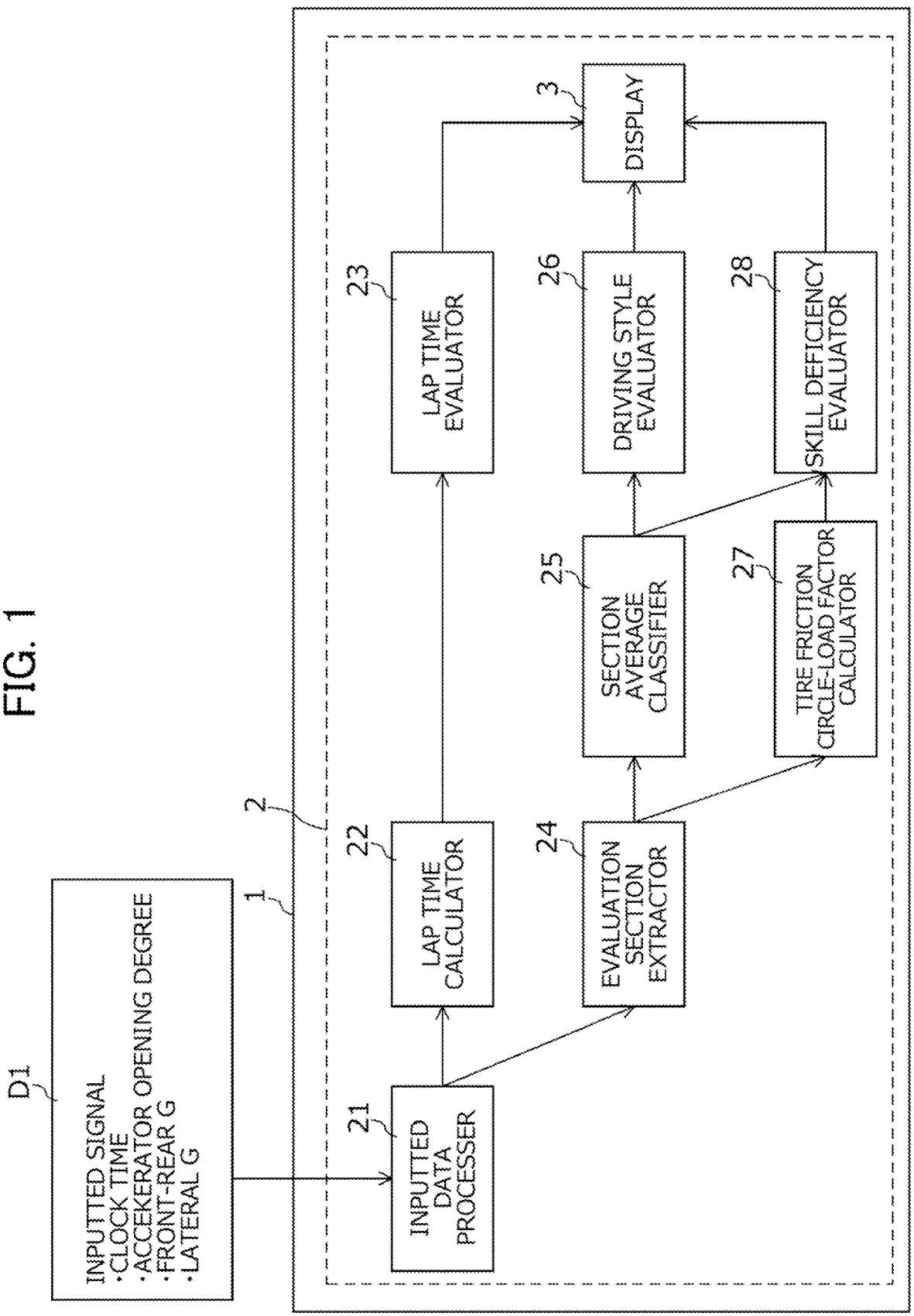
FIG. 1 is a diagram illustrating a driving evaluation device according to an embodiment of the invention.

An embodiment of the present invention will be described below with reference to the drawings. FIG. 1 is a block diagram illustrating a driving evaluation device 1 according to the present embodiment.

The driving evaluation device 1 acquires vehicle information Dl from a vehicle by means of, for example, a controller area network (CAN), and evaluates driving of a driver of the vehicle based on the vehicle information Dl. Here, the vehicle information Dl includes, for example, time information indicating current clock time, information indicating a degree of opening of an accelerator, front-rear acceleration information (front-rear G) indicating an acceleration in a direction of motion of the vehicle, and lateral acceleration information (lateral G) indicating an acceleration in a width direction of the vehicle. The driving evaluation device 1 may be equipped with an acceleration sensor to acquire the front-rear acceleration information and the lateral acceleration information. The driving evaluation device 1 may include a timer incorporated therein to acquire the time information.

The driving evaluation device 1 includes, for example, an arithmetic processing circuit 2 and a display 3. The display 3 is an image display apparatus, such as a liquid crystal display, and notifies a user of results of an evaluation of driving. The arithmetic processing circuit 2 performs processing procedures related to the driving evaluation by executing a driving evaluation program stored in a storage (not illustrated), and forms functional blocks corresponding to the processing procedures. The driving evaluation program is prestored in the driving evaluation device 1 to be provided. However, the driving evaluation program may be provided by way of a recording medium (e.g., a universal serial bus (USB) memory) with the programs recorded thereon, or by way of downloading via a network.

An inputted data processor 21 performs processing, such as noise reduction processing, on items of the vehicle information that are acquired sequentially, and thereby makes the items of the vehicle information utilizable by the driving evaluation device 1.

A lap time calculator 22 calculates lap times while a driver is driving on a circuit racecourse, based on the time information processed by the inputted data processor 21. A lap time evaluator 23 judges the lap times calculated by the lap time calculator 22, with reference to a lap time as a judgment reference set for the circuit racecourse where the driver is driving, and thereby evaluates the lap times. The driving evaluation device 1 displays a result of the evaluation on the display 3. In this way, the driving evaluation device 1 can evaluate, based on the lap times, the driving of the driver over the entire circuit racecourse.

Here, in order to shorten a lap time, it is necessary for a driver to drive around corners at a high speed, and accordingly, it is necessary to evaluate driving at the time of cornering. In detail, cornering is composed of successive sections including: a section in which the vehicle is decelerated to a speed at which the vehicle can turn the corner; a section in which the vehicle transitions from decelerating to turning; a section in which the vehicle turns and changes the direction of motion; a section in which the vehicle transitions from turning to accelerating; and a section in which the vehicle accelerates. However, from the viewpoint of operation performed by the driver, the cornering is composed of successive sections including: a deceleration section in which the drier decelerates the vehicle; and an acceleration section in which the driver accelerates the vehicle. The driver can shorten a time taken to turn the corner by suitably decelerating and accelerating the vehicle in the deceleration and acceleration sections.

Figure 2:
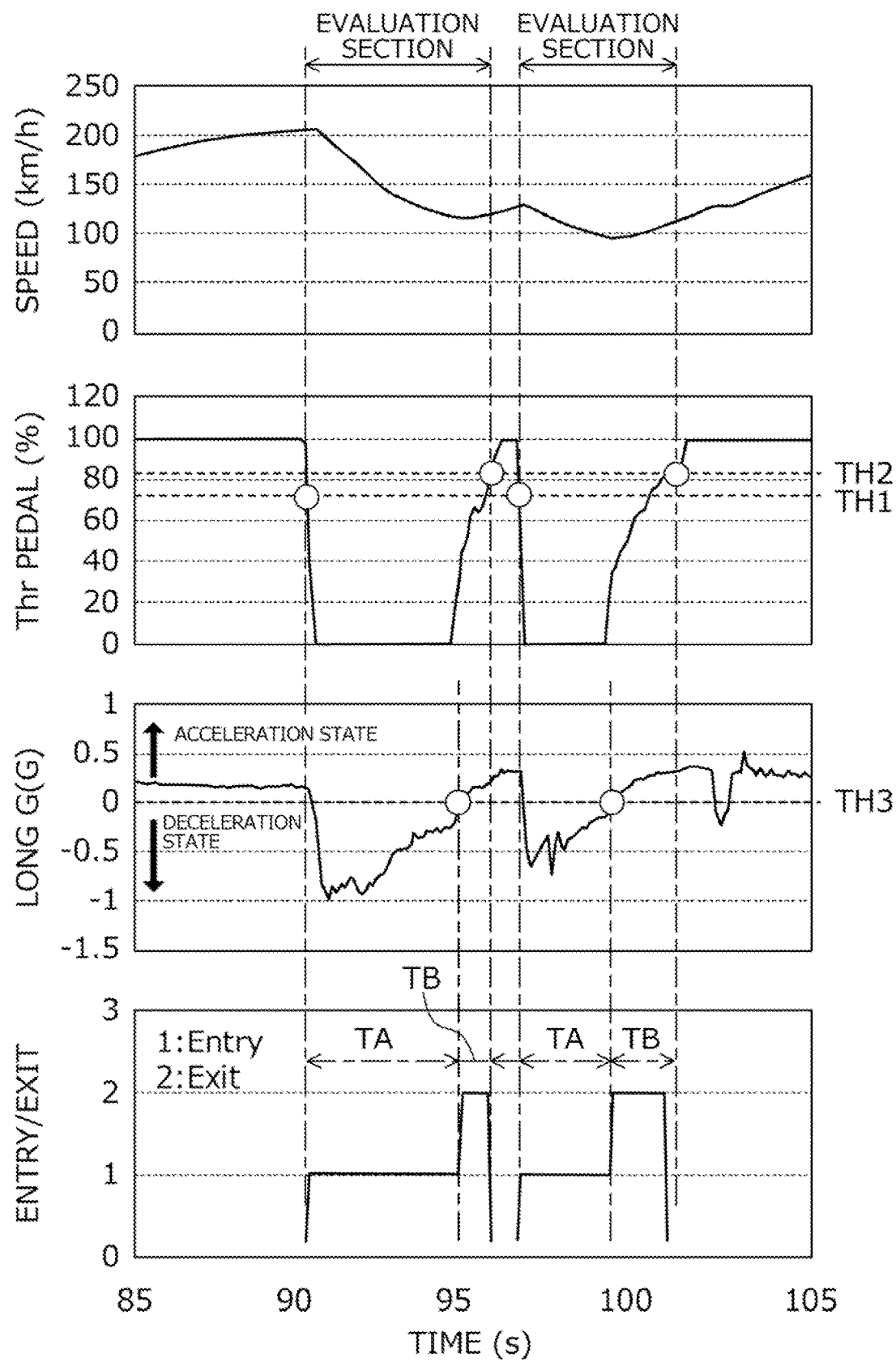
FIG. 2 illustrates graphs with reference to which an evaluation section, a deceleration section, and an acceleration section will be described.

Accordingly, an evaluation section extractor 24 detects the deceleration section and the acceleration section in cornering, based on a degree of opening of the accelerator (hereinafter referred to also as "accelerator opening degree"), and outputs front-rear accelerations and lateral accelerations while sorting the front-rear and lateral accelerations into the deceleration section and the acceleration section. Specifically, as illustrated in FIG. 2, the evaluation section extractor 24 detects a section (evaluation section) from a moment at which the accelerator opening degree (Thr Pedal) reaches and becomes less than a first judgment reference value TH1, to a moment at which the accelerator opening degree reaches a second judgment reference value TH2 after exceeding the first judgment reference value TH1. The evaluation section extractor 24 further judges the front-rear acceleration (Long G) in this evaluation section with reference to a third judgment reference value TH3, and divides the evaluation section into a deceleration section TA and an acceleration section TB. The present embodiment is based on the following precondition. In straight parts of the circuit racecourse, the vehicle moves at full throttle and at an acceleration set by the engine performance, whereas in corners and the like where it is difficult for the vehicle to move at full throttle, the vehicle moves at an acceleration set by the tire performance. Accordingly, the first and second judgment reference values TH1 and TH2 are set to an accelerator opening degree of 75% and an accelerator opening degree of 83%, respectively, with respect to an accelerator opening degree of 100% at full throttle. Note that the first and second judgment reference values TH1 and TH2 can be set to different values as needed. The third judgment reference value TH3 is set to 0 G, separating an acceleration state from a deceleration state. With reference to the third judgment reference value TH3 set to 0 G, the evaluation section extractor 24 sets, as the acceleration section, a section in which the front-rear acceleration is in the acceleration state subsequent to being in the deceleration state in the evaluation section. In FIG. 2, the graph denoted by "Entry/Exit" illustrates identification information regarding the deceleration section TA and the acceleration section TB.

A section average classifier 25 calculates an acceleration norm Gnorm by arithmetically processing the front-rear acceleration and the lateral acceleration sorted by the evaluation section extractor 24, according to Formula (1) below. In Formula (1), "LongG" and "LatG" represent the front-rear acceleration and the lateral acceleration, respectively.

$$\text{Gnorm} = \sqrt{(\text{LongG}^2 + \text{LatG}^2)} \quad (1)$$

The section average classifier 25 calculates an acceleration norm average value by averaging the calculated acceleration norm Gnorm in the deceleration section and in the acceleration section for each evaluation section, and outputs the calculation results to a driving style evaluator 26 and a skill deficiency evaluator 28. Specifically, the acceleration norm average value of one lap in a racecourse has a high correlation with a lap time. As the acceleration norm average value of one lap increases, the lap time becomes shorter, which indicates a good driving skill. Accordingly, the fact that the acceleration norm average value calculated by the section average classifier 25 is large indicates that the driver drove at a sufficient deceleration in the deceleration section and at a sufficient acceleration in the acceleration section, and therefore, the driver is evaluated to have a good skill in cornering.

Figure 3:
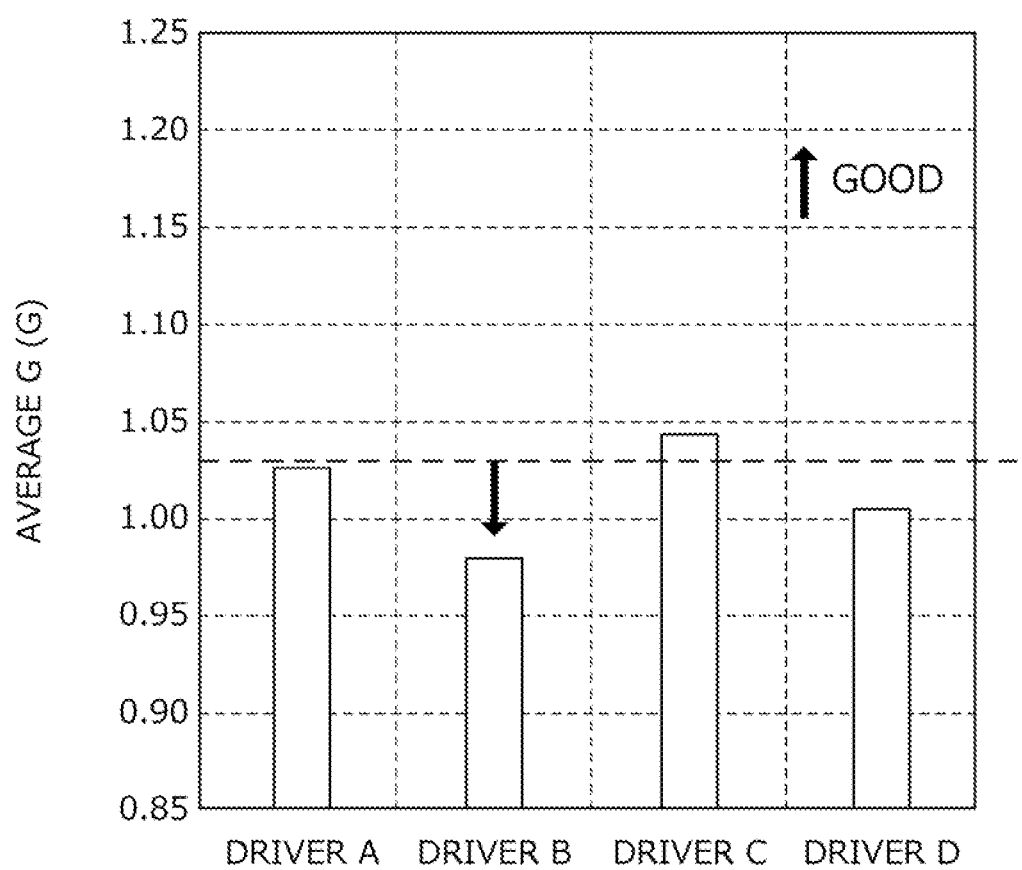
FIG. 3 is a graph illustrating acceleration norm average values detected in a deceleration section.
Figure 4:
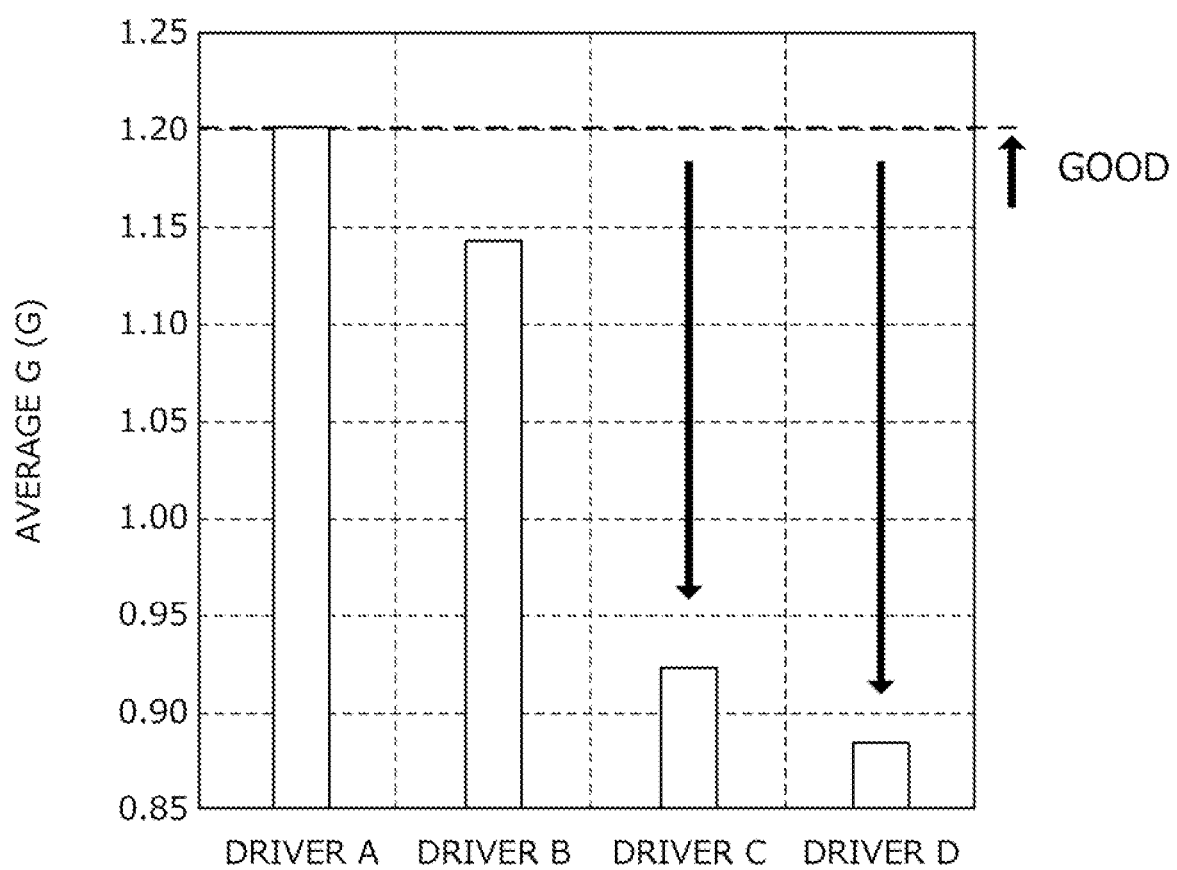
FIG. 4 is a graph illustrating acceleration norm average values detected in an acceleration section.
Figure 5:
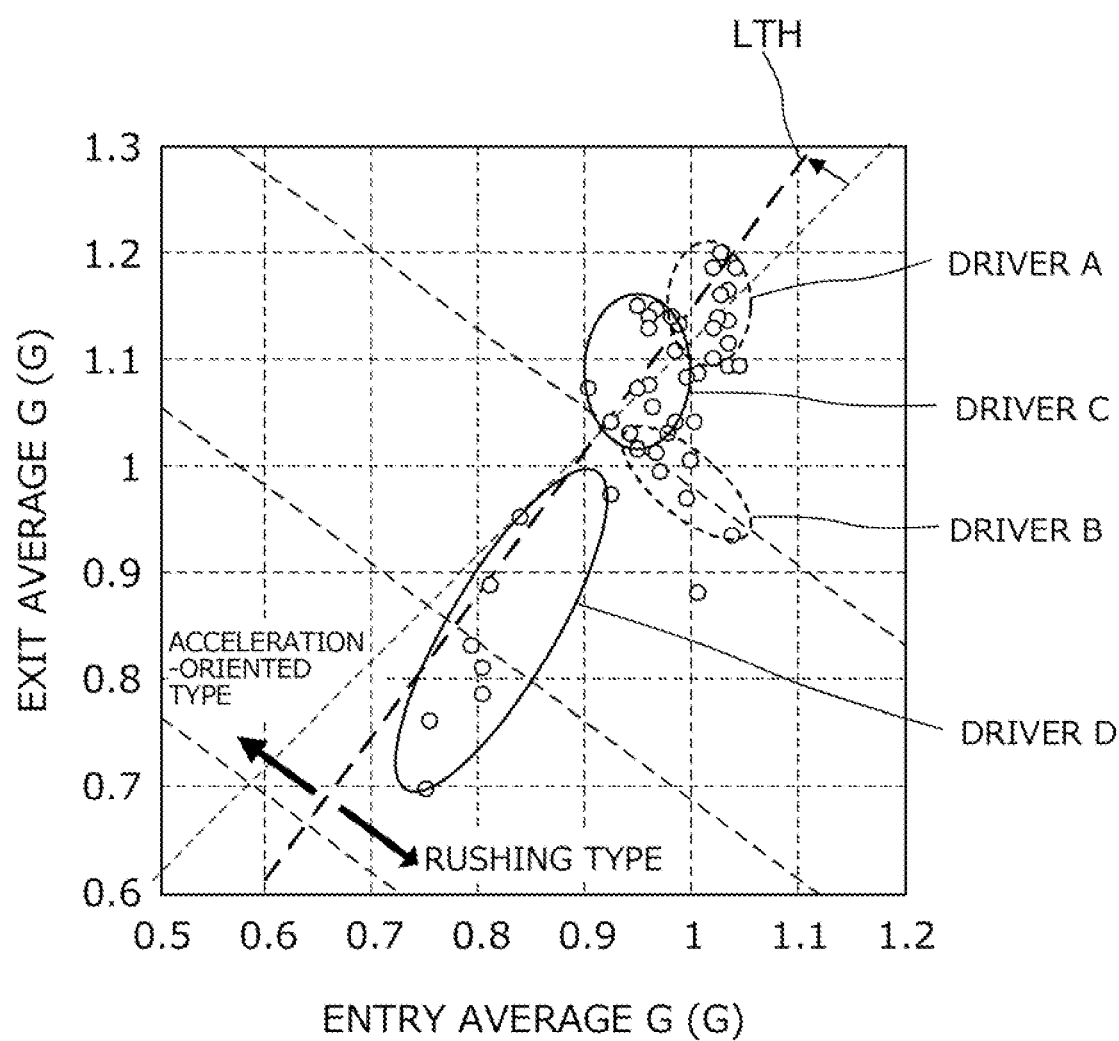
FIG. 5 illustrates a graph with reference to which an evaluation of acceleration norms will be described.

The driving style evaluator 26 judges the driving style of the driver based on the acceleration norm average value calculated by the section average classifier 25. Here, reference is made to FIG. 3, which is a graph illustrating acceleration norm average values (average G) of drivers A, B, C, and D in the deceleration sections. Likewise, FIG. 4 is a graph illustrating acceleration norm average values in the acceleration sections. In FIGS. 3 and 4, an evaluation reference value as a goal is indicated by a dashed line. Here, referring to the driver B, the acceleration norm average value in the acceleration section is approximately sufficient, whereas the acceleration norm average value in the deceleration section is low, as indicated by the arrow. Accordingly, it can be judged that the driving style of the driver B is a so-called turning-and-accelerating type: the driver B is a driver who enters a corner while decelerating sufficiently. Referring to the drivers C and D, their acceleration norm average values in the deceleration section are approximate to the reference value, whereas their acceleration norm average values in the acceleration section are low, as indicated by the arrows. Accordingly, it can be judged that the driving style of the drivers C and D is a so-called rushing type: the drivers C and D enter a corner without decelerating sufficiently. In this connection, FIG. 5 shows a graph in which the acceleration norm average values of the drivers A, B, C, and D are plotted, with respect to the horizontal axis representing the acceleration norm average value in the deceleration section (Entry Average G) and the vertical axis representing the acceleration norm average value in the acceleration section (Exit Average G). A reference straight-line LTH corresponding to the driving characteristics of the vehicle divides the coordinate plane into two regions: a region where the acceleration norm average value in the acceleration section is larger than that in the deceleration section; and a region where the acceleration norm average value in the acceleration section is smaller than that in the deceleration section. If the plots corresponding to the acceleration norm average values of the driver A, B, C, or D are distributed in the region where the acceleration norm average value in the acceleration section is larger, it can be judged that they are of the so-called rushing type. If the plots are distributed in the region where the acceleration norm average value in the acceleration section is smaller, it can be judged that the drivers are of an acceleration-oriented type.

In this way, the driving style evaluator 26 judges and totalizes the acceleration norm average values calculated by the section average classifier 25, with reference to the judgment reference value of the deceleration section and the judgment reference value of the acceleration section that are set for each of the corners of the circuit racecourse where the driver to be evaluated is driving. The driving style evaluator 26 judges and totalizes the acceleration norm average values of the acceleration sections with respect to the acceleration norm average values of the deceleration sections. The driving style evaluator 26 judges the driving style based on the results of the foregoing totalization and displays the result of the judgment on the display 3.

A tire friction circle-load factor calculator 27 calculates a tire friction circle and a tire load factor in the acceleration section and in the deceleration section of each evaluation section. As described earlier, if the acceleration norm average value in the acceleration section and that in the deceleration section increase, the driver can turn the corner quickly and improves his/her lap time. For this purpose, it is necessary to use the tires efficiently. Here, the following relationships are satisfied: the acceleration norm average value≈the sum of tire forces of the four wheel tires; and the tire force=the tire friction circle×the load factor. Thus, the acceleration norm average value can be increased by increasing the tire friction circle and the load factor. Since the tire friction circle and the load factor vary depending on driving skill, they can be used to evaluate driving skill. The tire friction circle represents, as a circle, the maximum force (tire force or grip force) that a tire can exert. The tire load factor is a ratio of a tire force being used, to the tire force represented by the tire friction circle.

Figure 6:
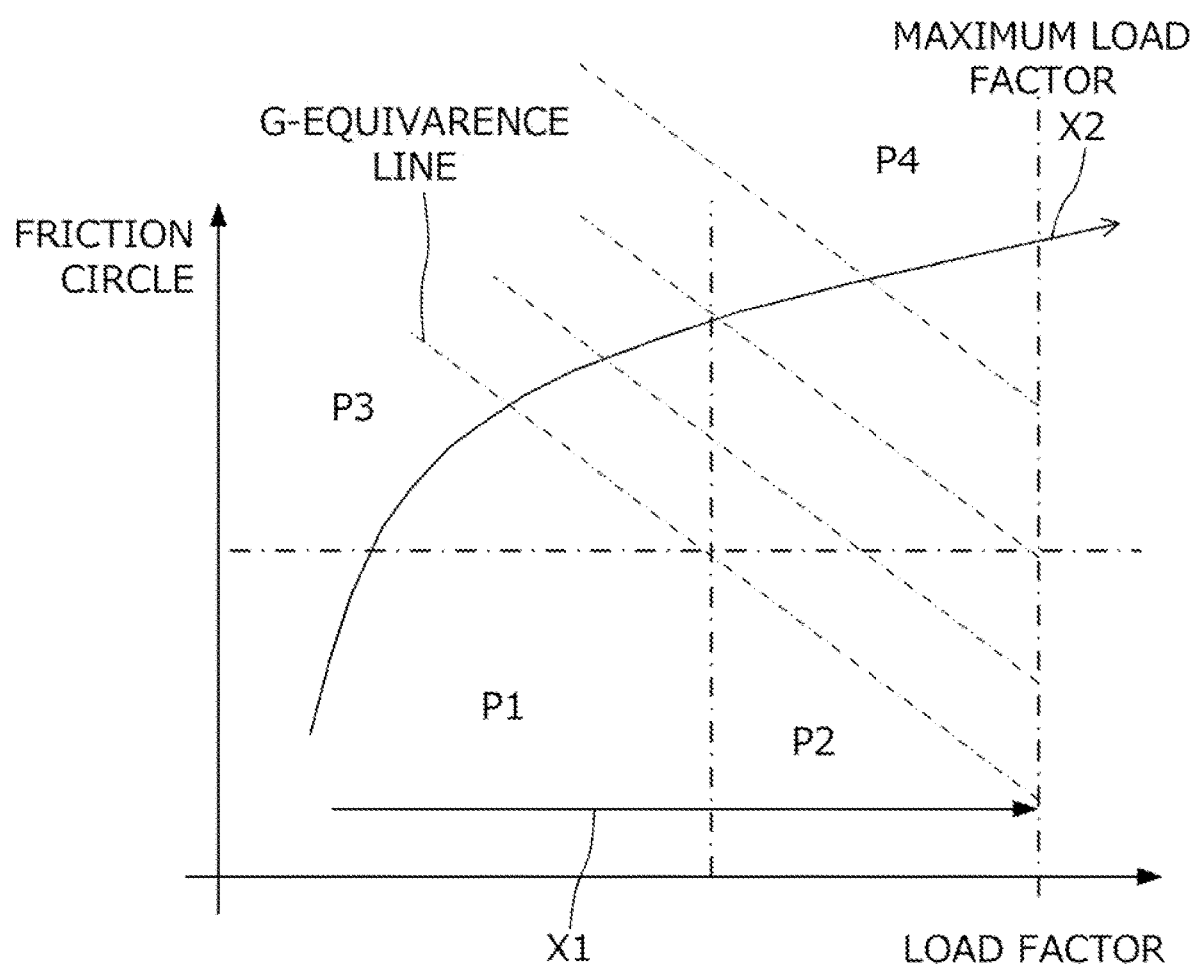
FIG. 6 illustrates a graph with reference to which a tire friction circle and a tire load factor will be described.

Reference is made to FIG. 6, which is a graph the vertical and horizontal axes of which represent the tire friction circle (friction circle) and the load factor, respectively. As indicated by the reference character P1 in the coordinate space of FIG. 6, most of drivers who experience driving on a circuit racecourse for the first time drive while the friction circle and the load factor are both small. If such a novice driver in this state tries to shorten his/her lap time, only the load factor increases as indicated by the arrow X1, and consequently, the novice driver tends to drive while the friction circle remains small and only the load factor is large, as indicated by the reference character P2. Under this condition, the potential of the vehicle cannot be fully demonstrated, and in addition, many drivers fail to improve their lap times. The situation in which only the load factor increases is caused by, for example, sudden deceleration without taking account of load shift in the front-rear direction, sudden steering without taking account of load shift in the lateral direction, sudden pressing of the accelerator during turning, and sudden load shift without taking account of the relationship between the front-rear acceleration and the lateral acceleration.

On the other hand, as indicated by the reference character P3, in a condition where load shift is appropriately performed and the load factor is low whereas the friction circle is large, G-equivalence lines are at high positions even though the load factor is low. The fact that the G-equivalence lines are at high positions means that the lap time is shortened and that the time can be improved efficiently.

Here, the G-equivalence line refers to a line obtained by connecting points at which the multiplication of the friction circle and the load factor gives equal values. When the load factor increases as a result of an attempt to shorten the lap time as indicted by the arrow X2, the tire friction circle and the load factor both increase as indicated by the reference character P4, whereby the lap time can be shortened further.

The tire friction circles F of the tires are given by the following Formulas (2-1) to (2-4), where the left and right front tires and the left and right rear tires are indicated by the subscripts $_{FL}$, $_{FR}$, $_{RL}$, and $_{RR}$, respectively. In the Formulas, h is a height of the center of gravity, l is a wheelbase, $a_x$ is a front-rear acceleration, $a_y$ is a lateral acceleration, $d_f$ is a front tread, $d_r$ is a rear tread, and R is mechanical balance (a front-rear distribution ratio of load shift). M is a mass of the vehicle applied to each tire, and g is a gravitational acceleration.

$$F_{z\_FL} = \max\left[M_{FL}\cdot g + (M_{FL}+M_{FR}+M_{RL}+M_{RR})\left(\frac{h}{2l}a_x + R\frac{2h}{d_f+d_r}a_y\right), 0\right] - \min\left[M_{FR}\cdot g + (M_{FL}+M_{FR}+M_{RL}+M_{RR})\left(\frac{h}{2l}a_x - R\frac{2h}{d_f+d_r}a_y\right), 0\right] \quad (2\text{-}1)$$

$$F_{z\_FR} = \max\left[M_{FR}\cdot g + (M_{FL}+M_{FR}+M_{RL}+M_{RR})\left(\frac{h}{2l}a_x + R\frac{2h}{d_f+d_r}a_y\right), 0\right] - \min\left[M_{FL}\cdot g + (M_{FL}+M_{FR}+M_{RL}+M_{RR})\left(\frac{h}{2l}a_x - R\frac{2h}{d_f+d_r}a_y\right), 0\right] \quad (2\text{-}2)$$

$$F_{z\_RL} = \max\left[M_{FL}\cdot g + (M_{FL}+M_{FR}+M_{RL}+M_{RR})\left(-\frac{h}{2l}a_x + R\frac{2h}{d_f+d_r}a_y\right), 0\right] - \min\left[M_{RR}\cdot g + (M_{FL}+M_{FR}+M_{RL}+M_{RR})\left(-\frac{h}{2l}a_x - R\frac{2h}{d_f+d_r}a_y\right), 0\right] \quad (2\text{-}3)$$

$$F_{z\_RR} = \max\left[M_{RR}\cdot g + (M_{FL}+M_{FR}+M_{RL}+M_{RR})\left(-\frac{h}{2l}a_x + R\frac{2h}{d_f+d_r}a_y\right), 0\right] - \min\left[M_{RL}\cdot g + (M_{FL}+M_{FR}+M_{RL}+M_{RR})\left(-\frac{h}{2l}a_x - R\frac{2h}{d_f+d_r}a_y\right), 0\right] \quad (2\text{-}4)$$

The tire friction circle-load factor calculator 27 calculates the tire friction circle F for each of the tires by arithmetic processing using the foregoing formulas.

Likewise, as indicated by Formulas (3-1) to (3-4) below, the tire load factor LF is expressed as a ratio of a composite, which is obtained by combining the tire front-rear force (tire force in the front-rear direction) $F_x$ and the tire lateral force (tire force in the lateral direction) $F_y$, to the tire friction circle F.

$$LF_{FL} = \frac{\sqrt{\left(\frac{F_{xFL}}{K_\mu \cdot \mu_{x_f}}\right)^2 + \left(\frac{F_{yFL}}{K_\mu \cdot \mu_{y_f}}\right)^2}}{F_{z_{FL}}} \times 100[\%] \quad (3\text{-}1)$$

$$LF_{FR} = \frac{\sqrt{\left(\frac{F_{xFR}}{K_\mu \cdot \mu_{x_f}}\right)^2 + \left(\frac{F_{yFR}}{K_\mu \cdot \mu_{y_f}}\right)^2}}{F_{z_{FR}}} \times 100[\%] \quad (3\text{-}2)$$

$$LF_{RL} = \frac{\sqrt{\left(\frac{F_{x\_RL}}{K_\mu \cdot \mu_{x\_r}}\right)^2 + \left(\frac{F_{y\_RL}}{K_\mu \cdot \mu_{y\_r}}\right)^2}}{F_{z\_RL}} \times 100[\%] \quad (3\text{-}3)$$

$$LF_{RR} = \frac{\sqrt{\left(\frac{F_{x\_RR}}{K_\mu \cdot \mu_{x\_r}}\right)^2 + \left(\frac{F_{y\_RR}}{K_\mu \cdot \mu_{y\_r}}\right)^2}}{F_{z\_RR}} \times 100[\%] \quad (3\text{-}4)$$

When $F_{x\_total} \geq 0$, the tire front-rear forces $F_x$ are given by Formulas (4-1) to (4-4) below.

$$F_{x\_FL\_Acc} = F_{x\_Total}\cdot\text{DriveBalance}\cdot(½-X\cdot a_y) \quad (4\text{-}1)$$

$$F_{x\_FR\_Acc} = F_{x\_Total}\cdot\text{DriveBalance}\cdot(½+X\cdot a_y) \quad (4\text{-}2)$$

$$F_{x\_RL\_Acc} = F_{x\_Total}\cdot(1-\text{DriveBalance})\cdot(½-X\cdot a_y) - F_{x\_RO} \quad (4\text{-}3)$$

$$F_{x\_RR\_Acc} = F_{x\_Total}\cdot(1-\text{DriveBalance})\cdot(½+X\cdot a_y) - F_{x\_RO} \quad (4\text{-}4)$$

When $Fx_{total} < 0$, the tire front-rear forces $F_x$ are given by Formulas (5-1) and (5-2) below.

$$F_{x\_FL\_Break} = F_{x\_FR\_Break} = \frac{F_{x\_Total}\cdot\text{BreakBalance}}{2} \quad (5\text{-}1)$$

$$F_{x\_RL\_Break} = F_{x\_RR\_Break} = \frac{F_{x\_Total}\cdot(1-\text{BreakBalance})}{2} - F_{x\_RO} \quad (5\text{-}2)$$

When $a_y \geq 0$, the tire lateral forces $F_y$ are given by Formulas (6-1) to (6-4) below.

$$F_{y\_FL} = \left\{(M_{FL}+M_{FR})a_y + \frac{I}{l}\dot{r}\right\}\left\{1 - \left(\frac{F_{z\_FR}}{F_{z\_FL}+F_{z\_FR}}\right) - \varepsilon\cdot F_{z\_FR}\right\} \quad (6\text{-}1)$$

$$F_{y\_FR} = \left\{(M_{FL}+M_{FR})a_y + \frac{I}{l}\dot{r}\right\}\left\{\frac{F_{z\_FR}}{F_{z\_FL}+F_{z\_FR}} - \varepsilon\cdot F_{z\_FR}\right\} \quad (6\text{-}2)$$

$$F_{y\_RL} = \left\{(M_{RL}+M_{RR})a_y - \frac{I}{l}\dot{r}\right\}\left\{1 - \left(\frac{F_{z\_RR}}{F_{z\_RL}+F_{z\_RR}}\right) - \varepsilon\cdot F_{z\_RR}\right\} - F_{y\_R0} \quad (6\text{-}3)$$

$$F_{y\_RR} = \left\{(M_{RL}+M_{RR})a_y - \frac{I}{l}\dot{r}\right\}\left\{\frac{F_{z\_RR}}{F_{z\_RL}+F_{z\_RR}} - \varepsilon\cdot F_{z\_RR}\right\} + F_{y\_R0} \quad (6\text{-}4)$$

When $a_y < 0$, the tire lateral forces $F_y$ are given by Formulas (7-1) to (7-4) below.

$$F_{y\_FL} = \left\{(M_{FL}+M_{FR})a_y + \frac{I}{l}\dot{r}\right\}\left\{\frac{F_{z\_FL}}{F_{z\_FL}+F_{z\_FR}} - \varepsilon\cdot F_{z\_FL}\right\} \quad (7\text{-}1)$$

$$F_{y\_FR} = \left\{(M_{FL}+M_{FR})a_y + \frac{I}{l}\dot{r}\right\}\left\{1 - \left(\frac{F_{z\_FL}}{F_{z\_FL}+F_{z\_FR}} - \varepsilon\cdot F_{z\_FL}\right)\right\} \quad (7\text{-}2)$$

$$F_{y\_RL} = \left\{(M_{RL}+M_{RR})a_y - \frac{I}{l}\dot{r}\right\}\left\{\frac{F_{z\_RL}}{F_{z\_RL}+F_{z\_RR}} - \varepsilon\cdot F_{z\_FL}\right\} - F_{y\_R0} \quad (7\text{-}3)$$

$$F_{y\_RR} = \left\{(M_{RL}+M_{RR})a_y - \frac{I}{l}\dot{r}\right\}\left\{1 - \left(\frac{F_{z\_RL}}{F_{z\_RL}+F_{z\_RR}} - \varepsilon\cdot F_{z\_RL}\right)\right\} + F_{y\_R0} \quad (7\text{-}4)$$

The $F_{x\_total}$ is given by Formula (8) below, using a drag force $K_A$.

$$F_{x\_total} = M\cdot a_x = K_A\cdot V^2 \quad (8)$$

The tire friction circle-load factor calculator 27 calculates the tire load factor LF of each tire by way of arithmetic processing using the foregoing formulas. Furthermore, the tire friction circle-load factor calculator 27 averages the calculated tire friction circles F and tire load factors LF of the tires in the acceleration section and the deceleration section of each evaluation section.

The skill deficiency evaluator 28 evaluates the driving skill and detects a deficiency in skill, based on the acceleration norm average values detected by the section average classifier 25 and the tire friction circles and the tire load factors calculated by the tire friction circle-load factor calculator 27. More specifically, the skill deficiency evaluator 28 judges the acceleration norm average value in the deceleration section and that in the acceleration section detected by the section average classifier 25, with reference to the respective judgment reference values, and totalizes the results to make a judgment. In this way, the skill deficiency evaluator 28 evaluates driving skill associated with the deceleration section and driving skill associated with the acceleration section, and determines whether an increase in the acceleration norm average value is necessary to shorten the lap time. When determining that an increase in the acceleration norm average value is needed, the skill deficiency evaluator 28 determines in which of the acceleration and deceleration sections the acceleration norm average value needs to be increased.

On the basis of the results of the above evaluation made based on the acceleration norm average values, the skill deficiency evaluator 28 evaluates the driving skill in more detail based on the tire friction circles and tire load factors, and detects a deficiency in skill that needs to be overcome to shorten the lap time. In this way, the skill deficiency evaluator 28 evaluates a turning operation, an acceleration operation, and a deceleration operation that the driver has to perform in cornering, in each of the deceleration section and the acceleration section.

Figure 7:
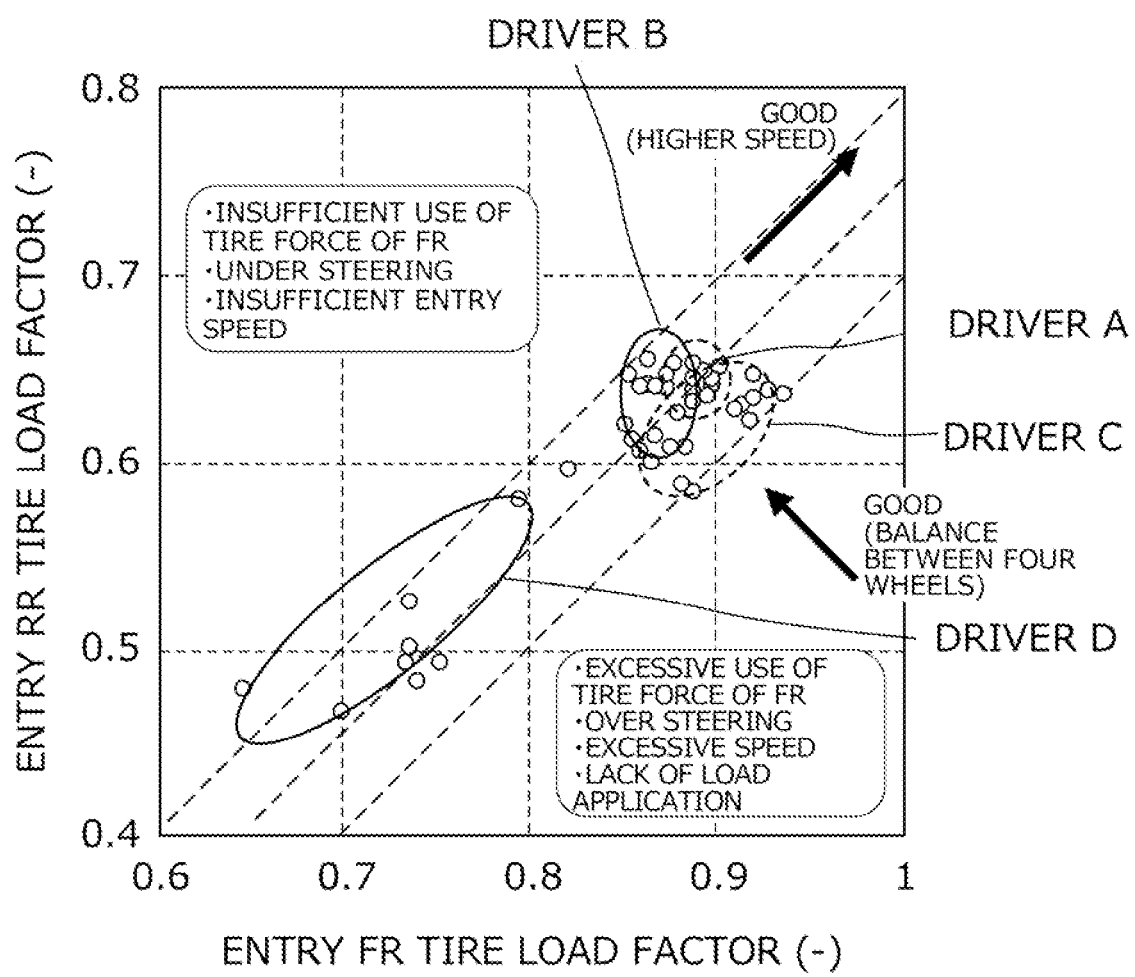
FIG. 7 illustrates a graph with reference to which an evaluation based on the tire load factor in a deceleration section will be described.
Figure 8:
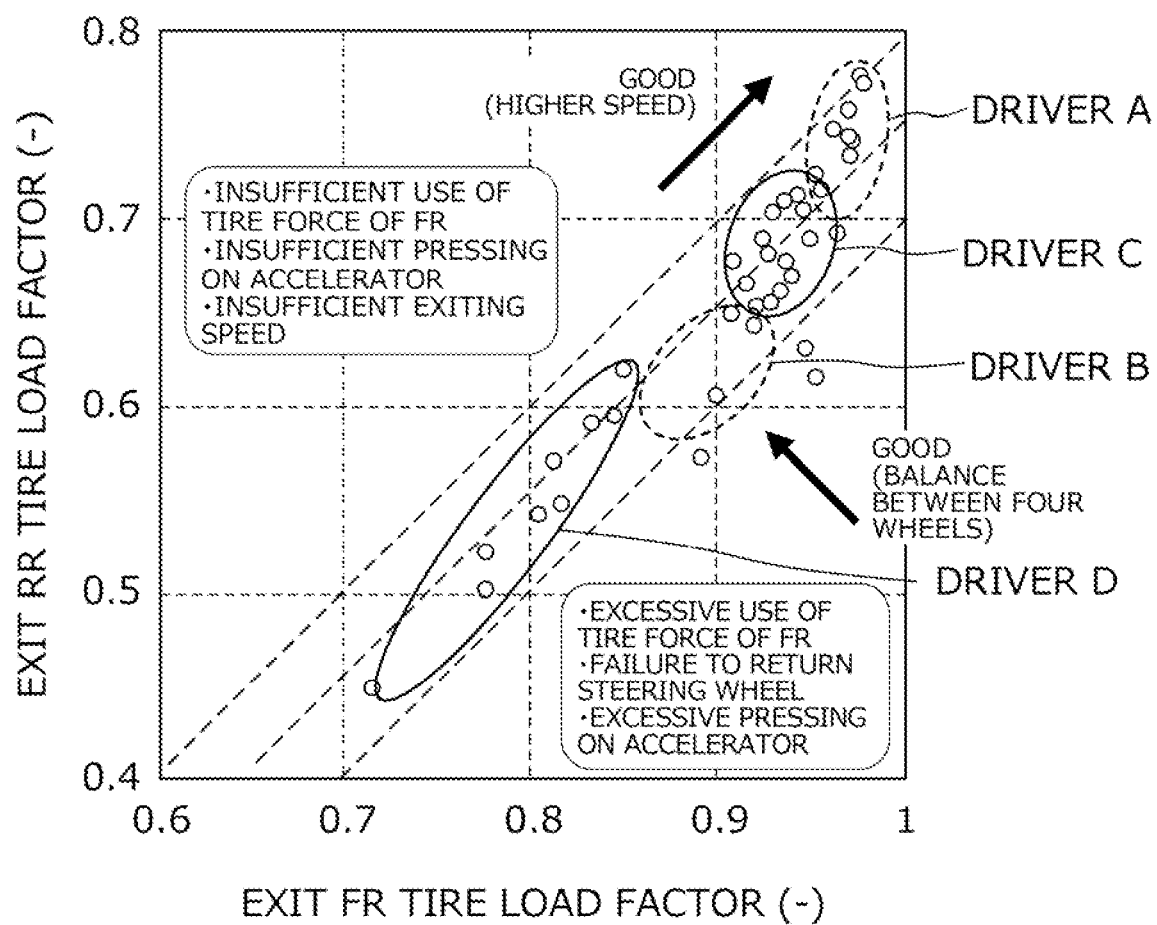
FIG. 8 illustrates a graph with reference to which an evaluation based on the tire load factor in an acceleration section will be described.

Here, reference is made to FIGS. 7 and 8, in contrast to FIG. 5., FIGS. 7 and 8 are each an example in which the tire load factors calculated by the tire friction circle-load factor calculator 27 are plotted on a coordinate plane, with respect to the horizontal axis representing the tire load factor of a front tire and the vertical axis representing the tire load factor of a rear tire. FIG. 7 corresponds to the deceleration section, and FIG. 8 corresponds to the acceleration section. The evaluations shown in FIGS. 7 and 8 are applied to a case where it is judged that the acceleration norm average value in the deceleration section and the acceleration norm average value in the acceleration section both need to be increased, as a result of a comparison between the acceleration norm average value in the deceleration section and that in the deceleration section. In the coordinate plane in FIG. 7, uneven distribution in which many plots are near the lower right corner indicates excessive use of the front tire force, which can be attributed to over-steering, excessive speed, and lack of application of load to the front tire. Uneven distribution in which many plots are in an upper left region indicates that the front tire force is not fully used. This means that the driver can turn the steering wheel further and can increase the entry speed.

On the other hand, in the coordinate plane in FIG. 8, uneven distribution in which many plots are near the lower right corner indicates excessive use of the front tire force, which can be attributed to failure to return the steering wheel and over-pressing on the accelerator pedal. Uneven distribution in which many plots are in an upper left region indicates that the front tire force is not fully used. This means that the driver can further press the accelerator pedal and can increase the exiting speed.

Figure 9:
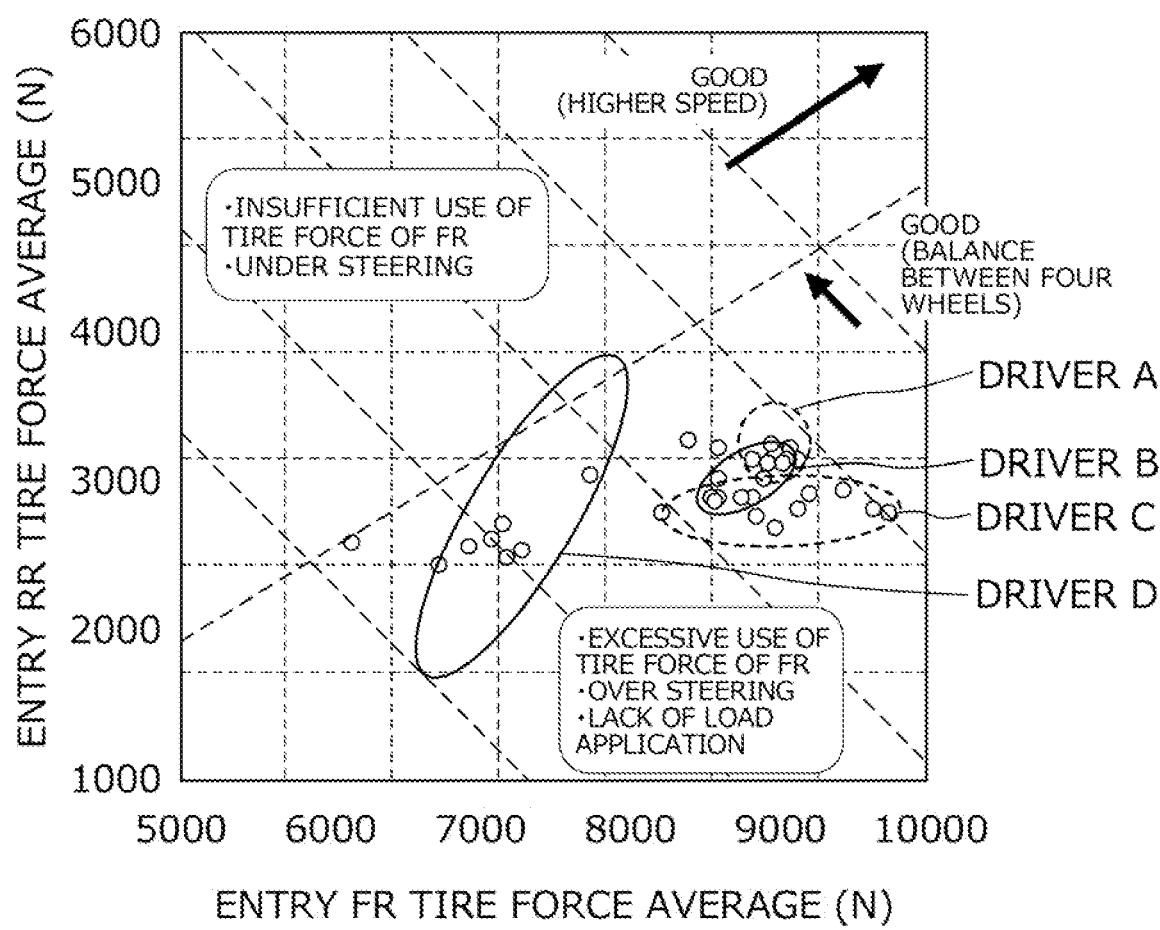
FIG. 9 illustrates a graph with reference to which an evaluation based on the tire friction circle in a deceleration section will be described.
Figure 10:
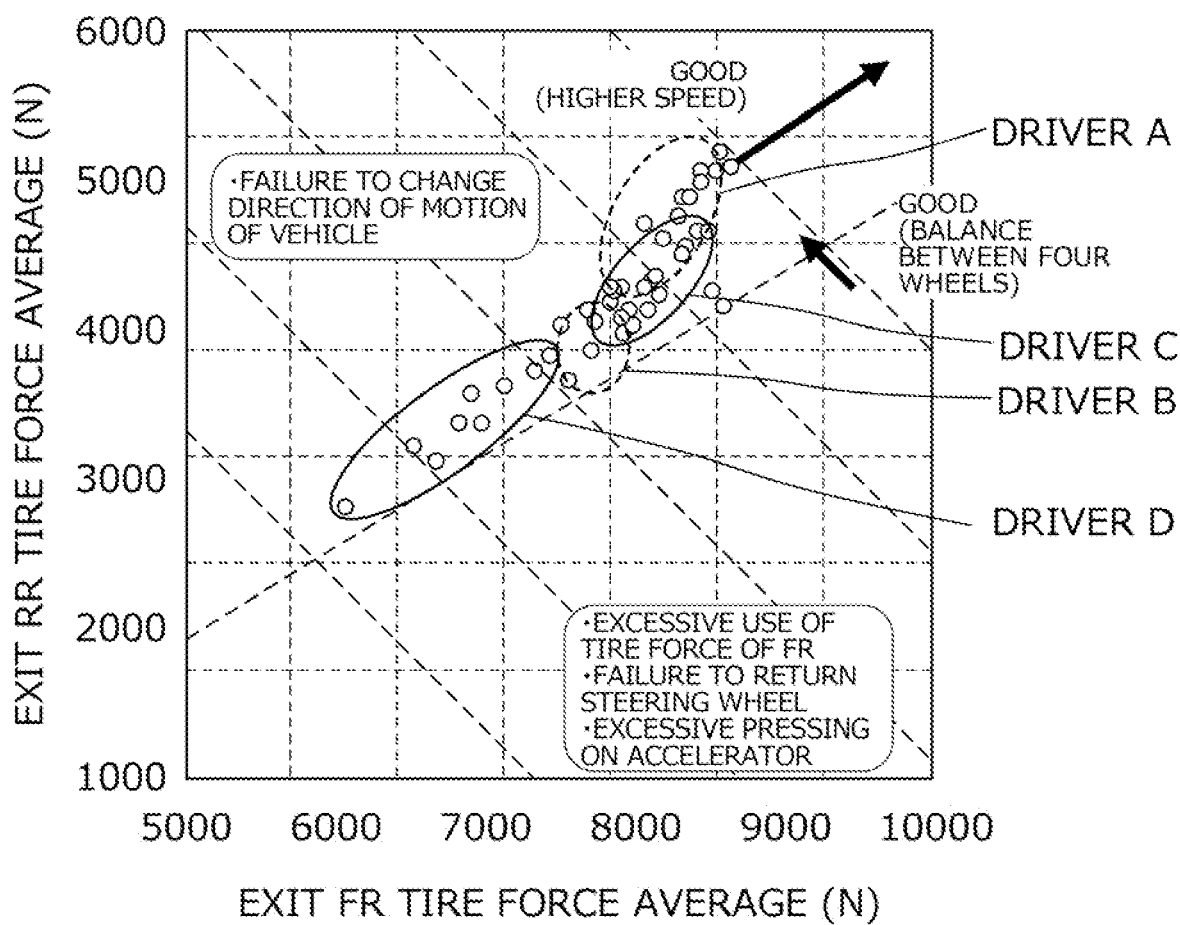
FIG. 10 illustrates a graph with reference to which an evaluation based on the tire friction circle in an acceleration section will be described.

FIGS. 9 and 10 are each an example in which the tire friction circles calculated by the tire friction circle-load factor calculator 27 are plotted on a coordinate plane, with respect to the horizontal axis representing the tire friction circle of a front tire and the vertical axis representing the tire friction circle of a rear tire. FIG. 9 corresponds to the deceleration section, and FIG. 10 corresponds to the acceleration section. The evaluations shown in FIGS. 9 and 10 are applied to a case where it is judged that the acceleration norm average value in the deceleration section and the acceleration norm average value in the acceleration section both need to be increased, as a result of a comparison between the acceleration norm average value in the deceleration section and that in the deceleration section. In the coordinate plane in FIG. 9, uneven distribution in which many plots are near the lower right corner indicates excessive use of the front tire force, which can be attributed to over-steering and lack of application of load to the front tire. Uneven distribution in which many plots are in an upper left region indicates that the front tire force is not fully used. This means that the driver can turn the steering wheel further.

On the other hand, in the coordinate plane in FIG. 10, uneven distribution in which many plots are near the lower right corner indicates excessive use of the front tire force, which can be attributed to failure to return the steering wheel and over-pressing on the accelerator pedal. Uneven distribution in which many plots are in an upper left region indicates failure to change the direction of motion of the vehicle. In this way, the skill deficiency evaluator 28 compares the acceleration norm average value in the deceleration section with that in the acceleration section, and thereby detects the section in which the acceleration norm average value needs to be increased. Further, as described above with reference to FIGS. 8 to 10, the skill deficiency evaluator 28 compares, based on the detection results, the tire friction circles and the tire load factors, and thereby detects a deficiency in skill.

FIG. 11 illustrates, as an example, messages that are generated based on a comparison between FIGS. 3 and 4, and are displayed to inform a deficiency in skill. In this example, the driving style (classification) detected by the driving style evaluator 26 is displayed for each of the drivers A, B, C, and D. In addition, comments regarding the deficiency in skill detected by the skill deficiency evaluator 28 are displayed.

It should be noted that the embodiment described above is not intended to limit the present invention.

What is claimed is:

1. A driving evaluation device for evaluating a driver's skill in driving a vehicle, the driving evaluation device comprising:
    a section detector that configured to detect a deceleration section and an acceleration section in cornering;
    an evaluator that configured to evaluate driving based on a front-rear acceleration and a lateral acceleration in the deceleration section and a front-rear acceleration and a lateral acceleration in the acceleration section; and
    a display configured to notify a user of results of an evaluation by the evaluator,
    wherein the evaluator is configured to perform processes for
    calculating an acceleration norm in the deceleration section based on the front-rear acceleration and the lateral acceleration in the deceleration section, calculating an acceleration norm in the acceleration section based on the front-rear acceleration and the lateral acceleration in the acceleration section,
calculating an acceleration norm average value over the entire deceleration section by averaging the acceleration norm in the deceleration section,
calculating an acceleration norm average value over the entire acceleration section by averaging the acceleration norm in the acceleration section,
evaluating the driver's skill based on a coordinate of the acceleration norm average value in the deceleration section and the acceleration norm average value in the acceleration section as a horizontal axis and a vertical axis, respectively.

2. The driving evaluation device according to claim 1,
wherein the section detector judges a degree of opening of an accelerator with reference to a first judgment reference value and a second judgment reference value,
wherein the section detector sets, as an evaluation section, a section from a moment at which the degree of opening of the accelerator reaches and becomes less than the first judgment reference value, to a moment at which the degree of opening of the accelerator reaches and exceeds the second judgment reference value, and
wherein the section detector detects the deceleration section and the acceleration section in the evaluation section.

3. The driving evaluation device according to claim 1,
wherein the section detector sets, as the acceleration section, a section in which the front-rear acceleration is in an acceleration state subsequent to being in a deceleration state.

4. The driving evaluation device according to claim 2,
wherein the section detector sets, as the acceleration section, a section in which the front-rear acceleration is in an acceleration state subsequent to being in a deceleration state.

5. A driving evaluation method to be performed by the driving evaluation device according to claim 1, the driving evaluation method comprising:
a section detection step including causing the section detector to detect a deceleration section and an acceleration section in cornering; and
an evaluation step including causing the evaluator to evaluate driving based on a front-rear acceleration and a lateral acceleration in the deceleration section and a front-rear acceleration and a lateral acceleration in the acceleration section; and
a display step including causing the display to notify the user of the results of the evaluation by the evaluator.

* * * * *